United States Patent
Rooney

(10) Patent No.: US 8,140,645 B2
(45) Date of Patent: Mar. 20, 2012

(54) INDEX SERVER SUPPORT TO FILE SHARING APPLICATIONS

(75) Inventor: John G. Rooney, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 12/166,068

(22) Filed: Jul. 1, 2008

(65) Prior Publication Data

US 2008/0275885 A1 Nov. 6, 2008

Related U.S. Application Data

(63) Continuation of application No. 10/536,718, filed on Jan. 26, 2006, now abandoned.

(30) Foreign Application Priority Data

Nov. 29, 2002 (EP) .................................. 02026673

(51) Int. Cl.
*G06F 15/16* (2006.01)
(52) U.S. Cl. ...................................... 709/219
(58) Field of Classification Search .................. 709/219
See application file for complete search history.

(56) References Cited

U.S. PATENT DOCUMENTS

| | | | |
|---|---|---|---|
| 5,941,956 A | 8/1999 | Shirakihara et al. | |
| 6,205,481 B1 * | 3/2001 | Heddaya et al. | 709/226 |
| 6,269,394 B1 * | 7/2001 | Kenner et al. | 709/217 |
| 6,374,253 B1 * | 4/2002 | Weider et al. | 1/1 |
| 6,567,857 B1 * | 5/2003 | Gupta et al. | 709/238 |
| 7,203,741 B2 | 4/2007 | Marco et al. | |
| 2001/0054045 A1 * | 12/2001 | Shirasaka | 707/204 |
| 2002/0062336 A1 | 5/2002 | Bjorner et al. | |
| 2002/0133621 A1 | 9/2002 | Leibowitz et al. | |

FOREIGN PATENT DOCUMENTS

| | | |
|---|---|---|
| JP | 7235929 A | 9/1995 |
| JP | 2000165449 A | 6/2000 |
| JP | 2002118568 A | 4/2002 |
| WO | WO0077662 A2 | 12/2000 |
| WO | WO 01/75652 A | 10/2001 |

(Continued)

OTHER PUBLICATIONS

Sakai, et al., "A Study on Adapting Active-Network Technology to P2P Networks", NIT Network Service Systems Laboratories, NIT Corporation, 2002, pp. 77.

(Continued)

*Primary Examiner* — Jeffrey Pwu
*Assistant Examiner* — Farhad Ali
(74) *Attorney, Agent, or Firm* — Scully, Scott, Murphy & Presser, P.C.; William Stock, Esq.

(57) ABSTRACT

An index server support for file sharing applications is disclosed. A way of retrieving an index server includes sending a request for investigating a hierarchical structure of index servers in a network to a known index server, intercepting the investigation request by the first index server that becomes aware of the investigation request, notifying an originator of the investigation request of the intercepting index server identity, dropping the intercepted request is dropped by the intercepting index server. The originator of the investigation request then registers the intercepting index server as addressee for future file querying requests.

16 Claims, 2 Drawing Sheets

FOREIGN PATENT DOCUMENTS

WO    WO 02/15035 A    2/2002

OTHER PUBLICATIONS

Atsumi, et al., "Route Establishment method for activenet in multicast and multicollect services", NIT DoCoMo Inc. Multimedia Labs., Hiroshma City University, The Institute of Electronics, Informatin and Communication Engineers, Technical Report of IEICE, IN2000-148, CQ2000-72(Nov. 2000), pp. 91-96 (with English language Abstract).

* cited by examiner

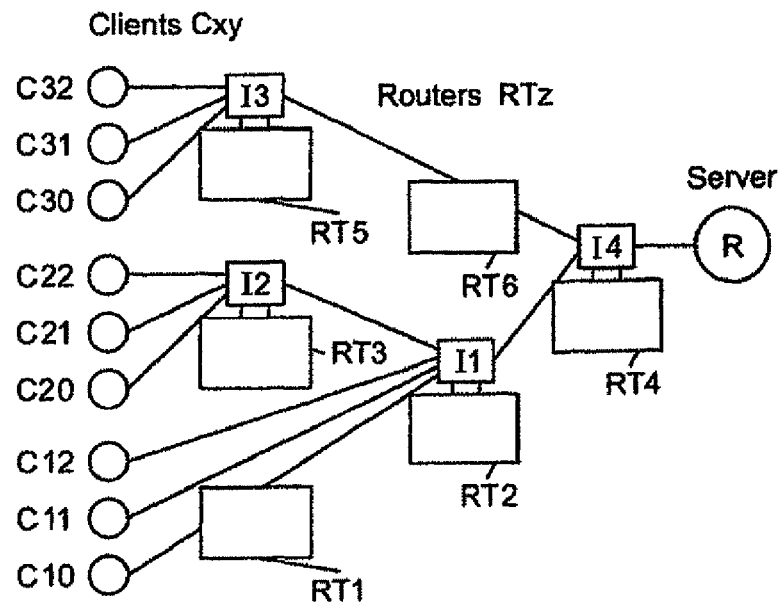
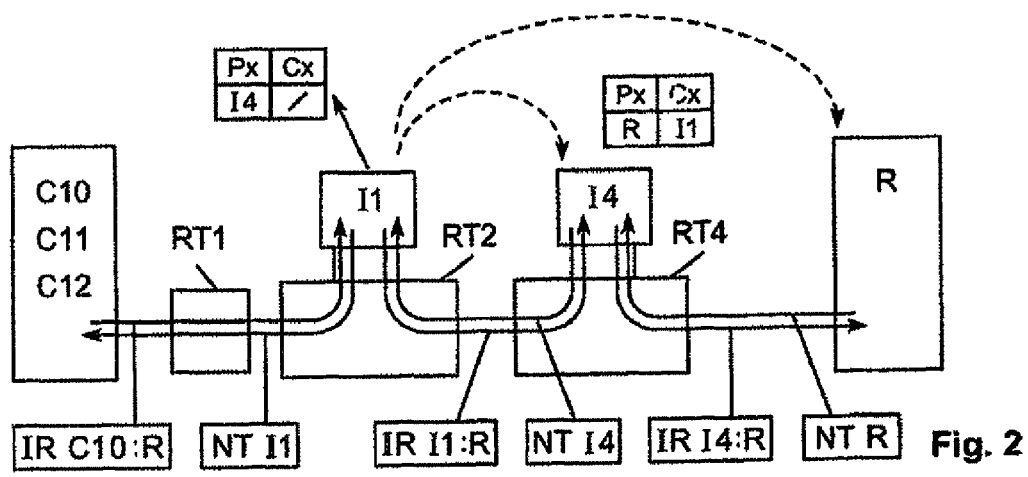
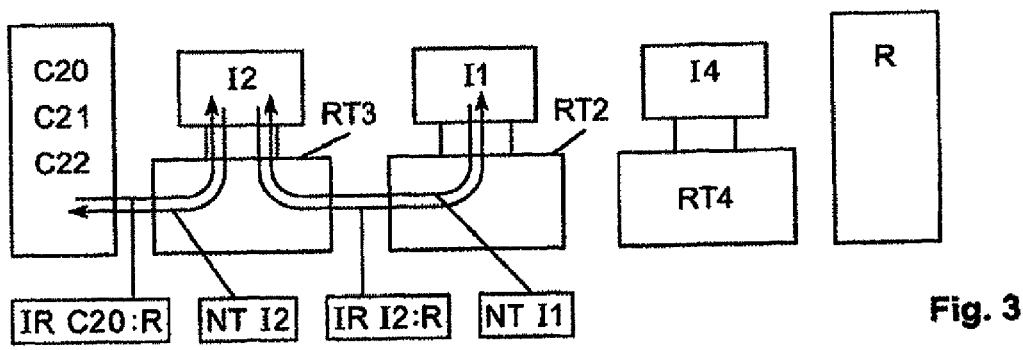
Fig. 1
Fig. 2
Fig. 3

INDEX SERVER SUPPORT TO FILE SHARING APPLICATIONS

CROSS REFERENCE AND PRIORITY

The present application is a continuation application of U.S. Ser. No. 10/536,718, filed Jan. 26, 2006, the entire contents of which are incorporated herein by reference. This application filed under 35 USC 371, is cross-referenced with, and claims priority from, International Patent Application PCT/IB2003/005137 filed on Nov. 12, 2003, and published in English with Publication No. WO 2004/051511 on Jun. 17, 2004, under PCT article 21(2), which in turn claims priority of EP02026673.0, filed on Nov. 29, 2002.

TECHNICAL FIELD

The present invention relates to a method of providing index server support to a file sharing application, to an index server, to a method for retrieving an index server, to a client computer for performing a file sharing application, and to corresponding computer program products.

BACKGROUND OF THE INVENTION

File sharing is the means by end-users can pool storage in order to create a very large repository. An end-user computer device—i.e. in general an electronic device that provides storing capacity and network access—can serve as data server with all or part of its stored data to other end-user computer devices when performing a file sharing application. Simultaneously, such computer device can query for files from other end-user computer devices and therefore obtain access to a large data repository that is stored across the connected end-user computer devices. This file sharing architecture is therefore different to common client/server systems where only dedicated server computers provide data for access to computer clients.

Nevertheless, computer devices performing file sharing applications are also called clients below due to their property of being clients to a file sharing application. File sharing applications in general vary in the means by which users/computer devices learn of the location of a file and request its copy.

In one form of file sharing applications, a central index is kept on a central index server. This index indicates which users are currently active and what files they currently possess. The economies of scale that a file sharing application with such central index engenders are huge with regard to storage and bandwidth that have to be provided.

For reasons of efficiency and resilience, an index can be distributed across multiple servers. Each server maintains an index that is part of the overall index. Sometimes, such index server has a reference which other index server to address to when it does not possess the relevant part of information itself. Such a link from one index server to another index server is not necessarily serving a quick file transfer since the known index server to address to for further information might be an index server located far away from the requesting index server and might provide information on clients that are also physically located in another part of the world than the requesting client. Even when such far remote index server might provide the requested information and provide a far remote client address that offers the queried file for download, such download would then a take long time and claim lots of network resources since requesting and serving client are located far from each other.

Therefore, it is appreciated to provide a mechanism that enables a client to obtain a file required from another client that has the required file available and is nearby.

U.S. Pat. No. 5,941,956 discloses a network system, in which a plurality of computers are connected to a network at a plurality of connectors, and a plurality of address conversion devices are provided in correspondence to the connectors. In each address conversion device a fixed address on the network corresponding to each address conversion device is stored while a computer address of one computer connected at one connector corresponding to each address conversion device is acquired and stored. Then, a source address contained in a message transmitted from that one computer to the network given in terms of the computer address is converted into the stored fixed address, while a destination address contained in a message transmitted from the network to that one computer given in terms of the fixed address is converted into the stored computer address.

Product announcement retrieved on the Internet http://www.itmcenter.com/vendors/radware.htm and accessed Nov. 26, 2002 shows a Web server that manages intelligent load balancing and proximity-based geographic redirection for classical client/server network topologies. Network traffic might be redirected between sites according to network proximity and actual load.

"Content delivery networks" by Mont Francisco, retrieved on the Internet http://www.newarchitectmag.com/archives/2001/03/francisco/ and accessed Nov. 26, 2002, describes a wide area traffic manager that directs content requests to the most appropriate location.

"Reduce network traffic with Web caching" by Rawn Shaw, September 1999, retrieved on the Internet http://www-106.ibm.com/developerworks/library/webcachinga.html and accessed Nov. 26, 2002, shows Web caches that aggregate all individual requests for a Web page and sends a single request as their proxy to the origin site. When the cache receives its copy of the contents, it then makes further copies and passes them on to the requesting users.

SUMMARY OF THE INVENTION

According to one aspect of the invention, there is provided a method of providing index server support to a file sharing application. Requests for investigating a hierarchical structure of index servers in a network are handled. An investigation request that is directed to a remote index server is intercepted. An originator of the investigation request is notified of the intercepting index server identity.

This method is preferably performed by an index server that supports a file sharing application within a network. Hence, according to another aspect of the invention, there is provided an index server comprising a control logic that is configured for performing such a method or any one of the method's embodiments. The control logic may be implemented in hardware or software or a combination thereof, or any other suitable implementation. According to another aspect of the invention, there is provided a computer program element comprising computer program code which, when loaded in a processor unit of an index server, configures the processor unit for performing such a method or any one of the method's embodiments.

File sharing applications typically enable computer devices to act as data or even services server and client. A computer device that is connected to other computer devices via a network offers a selection of files to other remote computer devices for download. Vice versa, this computer device is enabled to ask other computer devices for availability and download of files. Contrary to well-known client/server systems, clients of file sharing applications can now access data stored on other active clients without necessarily retrieving data from known data servers. Such file sharing is managed by an application. Known file sharing applications are for example Gnutella, etc.

Since a computer device does not know initially where to look for files, there might be index servers installed across the network providing support for file querying clients. An index server typically maintains an index that provides information as to which information service or file can be retrieved on which client. An index might map one or more files to a file sharing client. It might map only files that are currently available for download. Currently available preferably indicates that a computer device not only has a file stored in its repository and grants access to this file, but is also currently active in order to have the respective file downloaded immediately. However, an index might also prepared to map file sharing clients to files or services. The index may generally provide information on "where to look for what". This kind of information may be structured or defined in a different way than the ones proposed. Different index servers might contain overlapping or partly redundant information. Indexes of different index server represent together an overall index including all information available Instead of providing one central index on one central index server for a particular file sharing application it is preferred in accordance with one aspect of the present invention to provide an underlying network structure including several index servers and thus provide a distributed index table within the network. Such index server typically provides only a selection of information in its index, for example which data files are available on a limited number of computer devices the index server is responsible for.

It is core to the invention that requests for investigating a hierarchy of the network structure are sent over the network.

Originator of such requests are preferably end-user computer devices that preferably would like to investigate which index server to address to for further information when looking for a file. When it is not intention of clients to address such an investigated index server for future requests, the index servers itself may establish smart support for future requests, for example by way of having all client's requests redirected to itself, even when they are addressed elsewhere.

Originator of such a request may also be index servers that are looking for other index servers within the hierarchy of index servers, in particular for a child or for a parent index server. In particular, when an index server is not able to provide requested information to a client, it is preferred that this index server forwards this client's request to another index server that possibly can provide the requested information.

Destination of such initial investigation requests might be a well-known root index server that builds the top of an index server hierarchy, or might be another known index server, preferably a known central index server that is a high level index server in the index server hierarchy.

An index server monitors network traffic it has access to. Whenever an investigation request is monitored that is not addressed to the monitoring index server but directed to another index server, this request is intercepted. Whenever such a message is detected it is a strong hint that the intercepting index server location is closer in terms of network hops to the request's originator than the destination of the investigation request, since in general messages such as the investigation request are transferred to the destination taking the shortest path across the network via routers, gateways and other network equipment.

When an investigation request is intercepted the way described above, the originator of the intercepted request is extracted and a note is sent to this originator, thereby disclosing the identity of the intercepting index server. So, the originator of the investigation request is notified that there is another index server arranged between the originator and the destination.

This note might be interpreted by the originator as advice to address further requests to the intercepting index server, or might be taken as strict rule to direct all future requests to this particular index server. In particular query requests for files or other content query requests might then be addressed to the investigated intermediary index server.

The intercepting index server discloses its identity to the originator of the investigation request preferably by way of communicating its own address. In addition, it can be added that this address is connected to an index server name or other additional index server feature in order to make this index server unique and distinguishable from all other index servers the request's originator is aware of. In an alternative embodiment, the address of the intercepting index server is communicated to the request's originator but linked to the destination of the investigation request, e.g. to the name of a root index server. This process is called "masquerading". This enables the message's originator participating under this new communication protocol without having its software changed since future investigation requests as well as query or other requests can still be sent to the once determined root index server identity, which identity now is linked to the intercepting index server.

The intercepted request is dropped by the intermediary index server and thus not forwarded to its destination. The intercepted request may be dropped before or after notifying the originator in response to the intercepted investigation request.

By way of having this method performed on index servers or providing index servers performing this method, a file sharing client can provoke a notification from a nearby index server that was not familiar to the client so far, but that might be an index server that is located closer or closest to the client and thus might be attractive to direct further request to in order to save file transfer time and network resources.

The invention supports a very flexible installation or removal of index servers within a network at different locations since the hierarchical structure of index servers can be investigated whenever it is desired and requires little resources in form of a protocol implemented on an index server.

The invention adds autonomy to file sharing applications since clients and index servers can self-organize which index server to best address. Index servers can self-manage to adapt to new network topology.

In a preferred embodiment, the intercepted request is dropped and thus not forwarded to its destination. Then, the intercepting index server takes fall control over the investigation message. Alternatively, the intercepted request might be forwarded to its destination. Then, requesting client could receive multiple replies to the investigation request when there are more index servers on the request's path to the destination. After having received identification messages from different index servers, the client can use other means to determine which is closest and/or can choose one of these fur further communication.

In a preferred embodiment of the present aspect of the invention, not only the originator of the investigation request is notified of the intercepting index server identity but also the remote index server the investigation request is originally addressed to. This helps to make the remote index server become aware of the intercepting index server being a child index server. In terms of index server hierarchy, children index servers are at least one level below a parent index server.

The intercepting index server's identity is preferably stored on the remote index server, e.g. for having further requests directed to the intercepting index server as a child index server.

The remote index server may preferably send an investigation request to the intercepting index server in response to the notification. Such investigation request might help to disclose additional index servers that are located between the intercepting and the remote index server.

In a preferred embodiment, the index server itself shows the behaviour described above for parent index servers. The index server registers a remote index server as child index server, when a note from the remote index server is received that discloses its identity as intercepting index server. This feature helps an index server become aware of the hierarchical level in its environment. In response to such notification, the index server prefers sending or forwarding future query requests or other requests to this registered child index server.

Preferably, not only investigation requests directed to remote index servers are intercepted, but also investigation requests are accepted that are directed "regularly" to the present index server as recipient. Since a most close index server is not always unknown to its clients or children or parent index servers, an investigation request does not necessarily provoke interception but might be transmitted to its destination regularly. In return, the receiving index server notifies the originator accordingly.

In another preferred embodiment, the index server takes steps to investigate a parent index server. Accordingly, the index server sends an investigation request to a known index server and receives a notification in response to the request.

Preferably, the known index server is registered as a parent index server when the known index server is the originator of the received note.

The originator of the received note can also be registered as parent index server when the originator of the received note is not the known index server, but an intercepting index server.

Instead of registering an originator of the received note that is not the known index server immediately, a new investigation request is sent, now directed to the originator of the received note. A further notification is expected in response to this new investigation message and this further notification is evaluated. Preferably, the originator of this further notification is registered as parent index server. However, when the originator of this further note is not the addressee of the new investigation request but another intercepting index server, a new investigation request might be sent to this intercepting index server, and so on, as long as the most close index server is detected.

The proposed way of investigating parental index server structures can also be applied in order to investigate child index server structures. An investigation request might then be addressed to a known low level index server or a known client in order to be intercepted by an index server that is passed if any one exists.

Parent or child index server investigation is preferred to be started periodically—e.g. On a daily basis—since network topology might change and index servers may be added or removed.

In addition to handling investigation requests, the proposed method and/or the corresponding index server preferably handles requests for querying a file as part of a file sharing application. In response to a query or content request, an index of the index server is searched in order to find a registered client that can provide the queried file. Typically this client address is returned to the querying client.

When the queried file is not allocated to a client registered in the index the query is forwarded to a registered child index server. Alternatively, a corresponding request is transmitted to a registered child index server. This could satisfy the requesting client and provide a file from a nearby client that is registered with the addressed child index server since child index servers largely indicate proximity to the parent index server.

When the queried file is not allocated to a client registered in the index the query is forwarded to a registered parent index server. Alternatively, a corresponding request is transmitted to a registered parent index server. This embodiment is preferred when the queried index server is not aware of any child index servers or when the search in child index servers failed.

According to many of the preferred embodiments introduced below, the control logic is sending messages in order to manage requests. This has to be interpreted such that the control logic primarily decides on sending messages, while the physical transmission of messages is initiated by an interface that is controlled by the control logic or that is receiving messages from the control logic for forwarding.

The index server can be implemented as a stand alone electronic device in one preferred embodiment. In this embodiment, the index server has means to access a particular network line in order to intercept investigation requests in form of data packets. A filter unit as part of the index server could handle interception. The filter unit filters messages that indicate in one way or another that they are file sharing application related, for example by checking port fields of TCP messages. The filter unit might be embodied as packet filtering logic implemented on a network processor. The control unit might extract investigation requests of all filtered file sharing messages. The detection of investigation requests among other file sharing requests can also be implemented by the filter unit. Alternatively, investigation requests might be detected by means of the filter unit.

In an especially preferred embodiment, the index server is associated to a router. The index server can be a separate unit that receives or diverts network traffic—or even already filtered network traffic—from the router. Preferably, the index server uses the router for access and low level communication (packet) handling. The functions of the index server indicated above can also be implemented together with router functions into one single index server/router unit. Connecting the index server to a router is advantageous since quick access is granted and packets are guided via routers from the originator to the destination largely on the shortest path, such that allocating the index server to a router is at least roughly determining index server's location between a client and another index server.

There is another aspect of the present invention claimed providing a method for retrieving an index server client from a client's point of view. The method comprises sending a request for investigating a hierarchical structure of index servers in a network to a known index server, receiving a notification in response to the investigation request, and registering the originator of the received note as destination for future file query requests.

Accordingly, there is also provided a client computer for performing a file sharing application, comprising a control logic that is configured for performing such a method; and there is provided a computer program element comprising computer program code which, when loaded in a processor unit of a client computer, configures the processor unit for performing such a method.

There is another aspect of the present invention claimed providing a method for retrieving an index server client from a system's point of view, wherein a request for investigating a hierarchical structure of index servers in a network is sent to a known index server, wherein the investigation request is intercepted by the first index server that becomes aware of the investigation request, wherein an originator of the investigation request is notified of the intercepting index server identity, wherein the intercepted request is dropped by the intercepting index server without forwarding it to its destination, and wherein the originator of the investigation request is registering the intercepting index sever as addressee for file querying requests.

Advantages of all the different aspects of the invention and embodiments go along with the advantages of the inventive method and its embodiments described above.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating:

FIG. 1 a schematic diagram of a network including index servers according to an embodiment of the present invention, FIG. 2, 3, 4 each a diagram showing a way of investigating hierarchical structures of index servers in the network according to FIG. 1, in accordance with an embodiment of the present invention Different figures may contain identical references, representing elements with similar or uniform content.

DETAILED DESCRIPTION OF THE DRAWINGS

Figure 4:
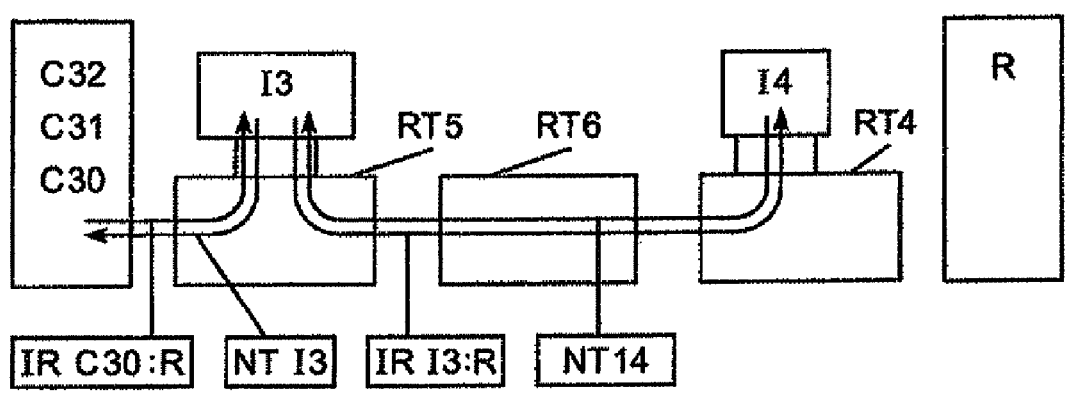

FIG. 1 shows a schematic diagram of a network including index servers according to an embodiment of the present invention. FIG. 1 shows the established network including clients and index servers that are aware of hierarchical structures. The hierarchical structures are investigated according to FIG. 2 to 4 and corresponding specification.

In FIG. 1: Clients C10-C12, C20-C22, C30-C32, that can be realized as computer devices including mobile phones, PDAs, laptops, or other devices, are located "at the edge" of a network as it is typical for file sharing devices. They have access to the network but not only for retrieving data from Web servers but also for running file sharing applications that make files stored on other clients available and in return makes files stored on the depicted clients available to other clients "at the edge" of the network.

Routers RT1-RT6 are configured for forwarding traffic over the network to its destination.

A root server R is introduced that hosts for example core information of the particular file sharing application. The root server address might be stored at a clients when a client accesses the root server for the first time, e.g. for downloading file sharing software in order to participate in the file sharing application.

Several index servers I1-I4 are provided, each of them coupled to a particular router RT2 to RT5. However, not every router—RT1 and RT6—is coupled to an index server because index servers usually do not show router's density across a network.

As can be derived from FIG. 1, the setup of index routers between clients Cxy and the root server R is organized as a tree. Thus, all clients Cxy that are close to one another in a "network distance" sense do now register with the same index server. The closest index server to clients C10, C11, C12 according to FIG. 1 is index server I1, the closest index server to clients C20, C21, C22 is index server I2, and so on. In addition, an index server provides preferably information on clients and their sharable files that are most close. Thus, the index itself is distributed across multiple index servers. Index server I1 for example preferably maintains an index including information on clients C10-C12. Hence, the distribution of the index is strongly associated with the location where the corresponding files are resident.

A request for querying content/file is first treated within this local scope. Index servers themselves are grouped into a hierarchy such that relative closeness within the hierarchy corresponds to network closeness.

If client C10 asks for a file in the network according to FIG. 1, then first index server I1 is asked since client C10 is aware of index server I1 being the closest index server. If index server I1 does not find this file in its index—which means that none of the clients C11 or C12 provides this file—it will ask all its children index severs, that is index server I2 according to FIG. 1. If the file is not found in the index of index server I2, then index server I1 asks its parent index server I4, which might forward the request to all its children index servers except I1 as requesting index server. This continues until the file is found, or the file is determined not to exist. When the file is found, the closest instance of the file is returned to client C10.

The way of self-organizing such closeness related hierarchy according to FIG. 1 is explained by means of FIG. 2 to 4.

FIG. 2, 3, 4 each show a diagram showing a way of investigating hierarchical structures of index servers in the network according to FIG. 1, in accordance with an embodiment of the present invention.

Arrows used in these figures indicate messages that are sent across the network. Each arrow is labeled with a tag, indicating the type of message, followed by the originator of the message, and—after the colon—the addressee of a message.

When a client is activated it tries to investigate the index server that is closest to its own location. Such index server can be detected by an investigation request that is directed to a known index server. An index server that is passed with this investigation request is probably at least closer to the client than the known index server. Thus, all index servers I1-I4 according to FIG. 1. are provided with a control logic according to one aspect of the invention in order to intercept such investigation requests when being monitored.

Starting with FIG. 2, first steps for self-organizing an index server hierarchy based on geographical closeness are introduced. Client C10 is activated and sends an investigation request IR to root server R, which address is known to client C10. This investigation request IR is to provoke exclamations of index servers on the path to root index server R, and thus can be interpreted as message with the investigating content: "Who do I have to talk to when talking to root server R?" or "How should I reach root server R?".

This investigation request IR from client C10 is directed from router RT1 to router RT2 and transferred to index server I1 since traffic is diverted from router RT2 to index server I1. Index server I1 was not known to client C10 before. Index server I1 is intercepting the investigation request IR directed to root server R and drops the request. In response to the intercepted investigation request IR, index server I1 sends a note NT to client C10, disclosing its identity. This note NT can also be interpreted having content: "In order to talk to root server R you have to talk to index server I1". Client C10 is storing this identity as index server to address to when looking for a file under this file sharing application.

Instead of immediately registering index server I1 as closest index server, client C10 may issue a new investigation request to index server I1 in order to check if there are other index servers located between client C10 and index server I1. This might be the case when the investigation message to root client R took initially another path than a message addressed to a more local destination would do.

Every client C10, C11, C12 is supposed to transmit an investigation request IR that is handled accordingly.

Index server I1 investigates its parental index servers the same way. An investigation request IR is directed from index server I1 to known root index server R and intercepted by index server I4. Index server I4 drops the intercepted request and notifies index server I1 on its identity. Index server I1 might then direct a new separate investigation request to index server I4 for reasons mentioned above or might register index server I4 immediately as parent index server. FIG. 2 indicates a table in connection with index server I1, showing parent index servers Px listed—this is index server I4—and showing no children index servers Cx listed since there are no children index servers so far.

Index server I4 investigates its parental index servers the same way. An investigation request IR is directed from index server I4 to known root index server R. Since there is no intermediary index server between index server I4 and root index server R, index server R receives the investigation request without intercepting any network traffic but as regular addressee and sends back a notification NT to index server I4 approving its identity. Thus, index server I4 registers root index server R as parent index server in the corresponding index. Index server I4 is additionally aware of child index server I1, either from intercepting the investigation request sent by index server I1 or by a separate note from I1, indicated with an dotted line arrow in FIG. 2. Index server I1 might also indicate its child index server presence to root index server R.

While the self-organizing process described so far in connection with FIG. 2 started with the clients C10-C12 investigating the most close index server, in most applications the index servers will first investigate hierarchical structures, preferably on a periodical basis in order to take into account any modifications in the network state. Clients will investigate the most close index server after the client itself is activated or the file sharing application is activated on the client.

FIG. 3 illustrates the way, clients C20-C22 investigate their parent index server I2, while index server I2 detects index server I1 as parent index server. Index server I1 is already aware of parent index server I4 (FIG. 2). Therefore there is no actual need to take further investigation steps for index server I1.

FIG. 4 illustrates the way, clients C30-C32 investigate their parent index server I3, while index server I3 is detecting index server I4 as parent index server. Index server I4 is already aware of root index server R (FIG. 2). Therefore there is no actual need to take further investigation steps for index server I4.

When clients have investigated their parent index servers they typically direct content queries to this parent index server. However, in an alternative embodiment content requests from respective clients are still directed to for example the known root sever. Then this traffic is intercepted and directed to the parent server instead, due to advice from the parent server to the corresponding router to do so. This embodiment is especially preferred when the index server is coupled to a router. Then, a client would not have to modify destinations, when e.g. the root server is default address for file application requests.

Redirection commands can be implemented using standard protocols such as OSPF or SNMP. When the index server itself has access to a network line, the index server can itself forward all data packets and extract those that are relevant.

The initialization protocol is preferred to be performed using UDP. In this case, the investigation request and the corresponding reply note are sent as UDP datagrams.

Existing index based file sharing protocols may use HTTP/TCP, in which case an index server according to the present invention can intercept the TCP SYN message and create a TCP connection masquerading as the root index server to the client and then redirect the client, using a HTTP redirect to the index server's own address.

The invention claimed is:

1. A method of providing index server support to a file sharing application, said method comprising:
   handling requests for investigating a hierarchical structure of index servers in a network, including:
      intercepting, by an intercepting index server, an investigation request that is directed to a remote index server, the intercepting index server storing only an index providing information as to which data or file can be found on which client computer device, the intercepting index server being a closest index server to an originator of the investigation request;
      notifying, by the intercepting index server, the originator of the investigation request of an identity of the intercepting index server; and
      preventing forwarding of the intercepted investigation request to the remote index server;
   handling the requests for querying a file as part of a file sharing application, including:
      searching an index of the intercepting index server for a registered client that can provide the queried file; and
      forwarding the query to a registered child index server of the intercepted index server when the queried file is not allocated to a client registered in the index of the intercepting index server.

2. The method according to claim 1, further comprising:
   notifying the remote index server of the intercepting index server identity.

3. The method according to claim 1, further comprising:
   accepting an investigation request as recipient; and
   notifying an originator of the investigation request in response to the investigation request.

4. The method according to claim 1, further comprising:
   receiving a note from a remote intercepting index server disclosing its identity; and
   registering the remote intercepting index server as child index server.

5. The method according to claim 1, further comprising:
   sending an investigation request to a known index server; and
   receiving a notification in response to the request.

6. The method according to claim 5, further comprising:
   registering the known index server as a parent index server when the known index server is the originator of the received notification.

7. The method according to claim 5, further comprising:
registering the originator of the received notification as parent index server when the originator of the received notification is not the known index server.

8. The method according to claim 5, further comprising:
sending an investigation request to the originator of the response when the originator of the received notification is not the known index server but another index server; and
receiving a further notification in response to this further investigation message.

9. The method according to claim 8, further comprising:
registering the originator of the further notification as parent index server.

10. The method according to claim 1, comprising:
forwarding the query to a registered parent index server when the queried file is not allocated to a client registered in the index.

11. An article of manufacture comprising a non-transitory computer usable medium having computer readable program code means embodied therein for causing provision of index server support to a file sharing application, the computer readable program code means in said article of manufacture comprising computer readable program code means for causing a computer to effect the steps of claim 1.

12. An index server, comprising:
a hardware control logic that is configured for performing a method as claimed in claim 1.

13. A method for investigating index servers, said method comprising:
handling requests for investigating a hierarchical structure of index servers in a network, including:
sending, from an end-user computer device, a request for investigating a hierarchical structure of the index servers in a network to a known index server;
intercepting, by an intermediary index server, the investigating request, preventing forwarding of the intercepted investigation request to the known index server in the hierarchical structure, the intermediary index server storing only an index providing information as to which data or file can be found on which end-user computer device, the intermediary index server being a closest index server to the end-user computer device that sent the request;
sending, by the intermediary index server, a notification of an identity of the intermediary index server to the end-user computer device in response to the investigation request; and
registering, at the end-user computer device, the intermediary index server as a destination for future file query requests;
handling the requests for querying a file as part of a file sharing application, including:
searching an index of the intermediary index server for a registered client that can provide the queried file; and
forwarding the query to a registered child index server of the intermediary index server when the queried file is not allocated to a client registered in the index of the intermediary index server.

14. A client computer for performing a file sharing application, said client computer comprising a control logic that is configured for performing a method as claimed in claim 13.

15. A system for investigating index servers, said system comprising:
an originator sending a request for investigating a hierarchical structure of the index servers in a network to a known index server;
a first index server that becomes aware of the investigation request, intercepting said investigation request, notifying the originator of the investigation request of the first index server identity, and preventing forwarding of the intercepted request to a destination of the intercepted request, the first index server storing only an index providing information as to which data or file can be found on which client computer device, the first index server being a closest index server to the originator of the investigation request;
the originator of the investigation request registering the first index sever as addressee for file querying requests; and
the first index server searching an index of the first index server for a registered client that can provide the queried file and forwarding the query to a registered child index server of the first index server when the queried file is not allocated to a client registered in the index of the first index server.

16. A program storage device readable by machine, tangibly embodying a program of instructions executable by the machine to perform method steps for retrieving an index server, said method steps comprising the steps of claim 15.

* * * * *